United States Patent [19]

Dupper et al.

[11] Patent Number: 5,706,456
[45] Date of Patent: Jan. 6, 1998

[54] APPLICATION SPECIFIC GRAPHICAL USER INTERFACE (GUI) THAT IS WINDOW PROGRAMMABLE AND CAPABLE OF OPERATING ABOVE A WINDOWS OPERATING SYSTEM GUI

[75] Inventors: Jerry L. Dupper, Devon; Peter K. Nagy, Harleysville, both of Pa.

[73] Assignee: Unisys Corporation, Blue Bell, Pa.

[21] Appl. No.: 425,018

[22] Filed: Apr. 18, 1995

[51] Int. Cl.⁶ .................................................. G06F 3/00
[52] U.S. Cl. ........................ 395/349; 395/335; 395/353
[58] Field of Search ................................. 395/155–161, 395/333, 334, 335, 339, 348, 349, 353

[56] References Cited

U.S. PATENT DOCUMENTS

| | | | |
|---|---|---|---|
| 4,931,783 | 6/1990 | Atkinson | 395/353 X |
| 5,157,384 | 10/1992 | Greanias et al. | 345/156 |
| 5,347,629 | 9/1994 | Barrett et al. | 395/161 |
| 5,394,521 | 2/1995 | Henderson, Jr. et al. | 395/346 |
| 5,398,312 | 3/1995 | Hoffmann | 395/156 |
| 5,404,441 | 4/1995 | Satoyama | 395/155 |
| 5,412,772 | 5/1995 | Monson | 395/155 |
| 5,414,809 | 5/1995 | Hogan et al. | 395/155 |
| 5,430,836 | 7/1995 | Wolf et al. | 395/155 |
| 5,442,788 | 8/1995 | Bier | 395/650 |
| 5,590,330 | 12/1996 | Coskun et al. | 395/326 X |

*Primary Examiner*—Raymond J. Bayerl
*Assistant Examiner*—A. Katbab
*Attorney, Agent, or Firm*—John B. Sowell; Mark T. Starr; John F. O'Rourke

[57] ABSTRACT

A desktop programmable Graphical User Interface (GUI) workstation that can be easily programmed to perform a custom applications, without the need of text editor. In other words, programming the desktop programmable GUI workstation does not require the program user to utilize a text editor, create or edit code, or understand any particular programming language. The programmer user can program the workstation in an icon environment from predefined functions stored in libraries. Once programmed the workstation employs a GUI which provides an end user with an easy to use and easy to understand interface to their application specific process. The user interface is structured to organize work tasks by major activities of the application specific process. The workstation allows the user to integrate generic window technology such as word processing into their application specific process.

8 Claims, 7 Drawing Sheets

APPLICATION SPECIFIC GRAPHICAL USER INTERFACE (GUI) THAT IS WINDOW PROGRAMMABLE AND CAPABLE OF OPERATING ABOVE A WINDOWS OPERATING SYSTEM GUI

BACKGROUND OF THE INVENTION

1. Field of the Invention

The present invention relates to graphical user interfaces, and more specifically, to a programmable desktop manager workstation.

2. Related Art

Most users of personal computers (PCs) and workstations employ an iconic graphical user interface (GUI) providing users with windows, icons, and menus to perform tasks. Currently, Microsoft® Windows operating system is the most popularly used GUI. The Windows GUI includes rectangular areas of the computer screen; the windows. These windows appear on a background known as the desktop. Applications (such as word-processing or spread-sheets applications) are represented in windows by small graphical symbols; the icons.

Figure 1:
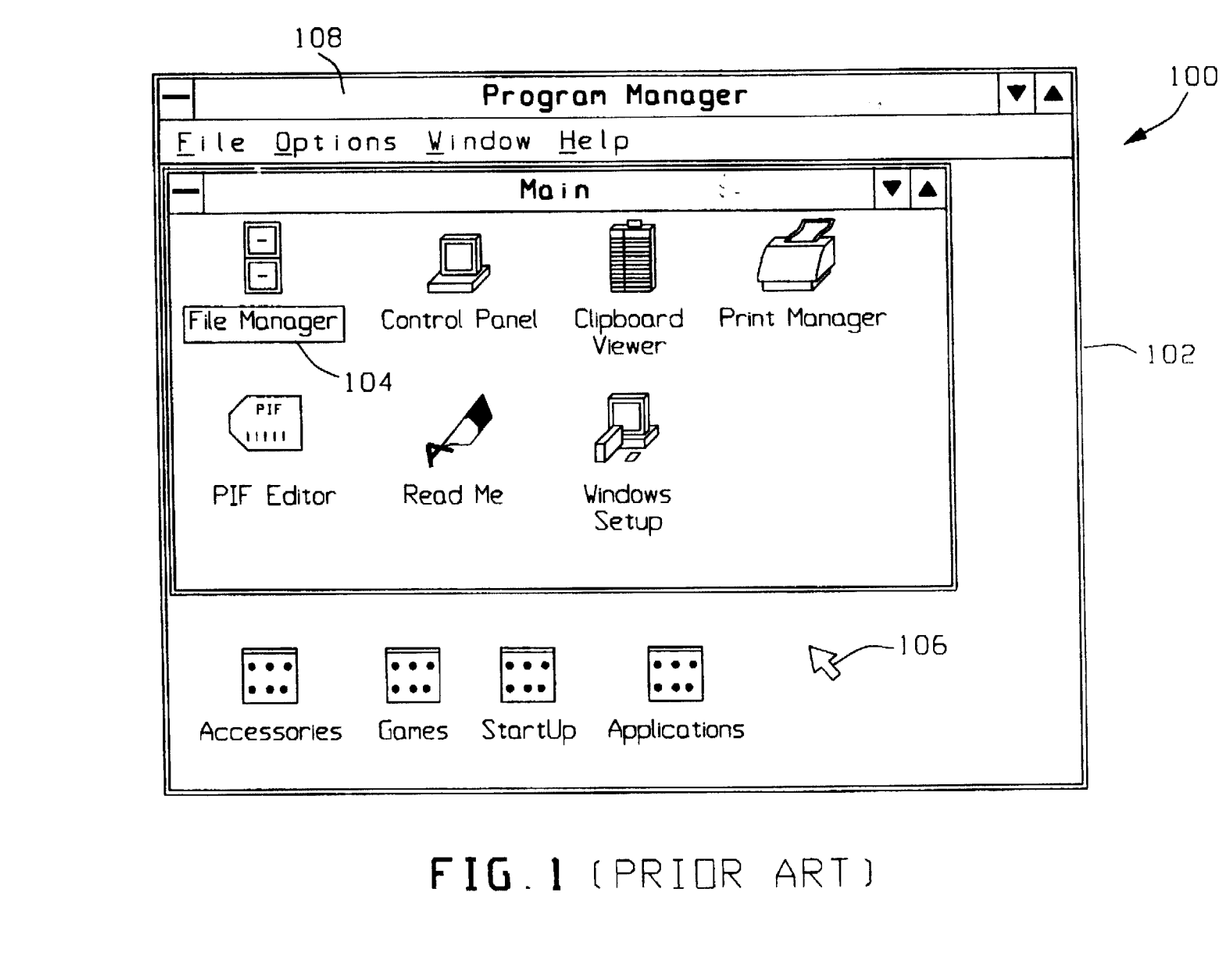
FIG. 1 shows a windows based Graphical User Interface.

FIG. 1 shows a windows based GUI. Referring to FIG. 1, when Windows is started, a Program Manager 100 is the first thing a user sees and continues to run as long as Windows is used. Initially the Program Manager 100 displays a window 102 having a group of icons 104, which represent applications that can be run. The program manager 100 is identified in a title bar 108 of the window 102. Behind the Program Manager 100, is a screen background or the desktop. To carry out an action in Windows, a mouse pointer 106 is used to select an application by double clicking on an icon 104.

Once in the application, a user normally has to return to the program manager 100 to select other applications. Once in an application, the user toggles between various applications to perform different tasks (e.g., toggle between a word processing application and an E-Mail application). Often times the desk top resembles a conglomerate of non-integrated applications.

It is very difficult to set-up a desktop to perform customer specific job function workstations (e.g., loan administrator, credit card service representative, insurance risk administrator, etc.). To obtain a customer specific job function workstation, the user must either purchase such application-specific software or design a custom program. Such software, then becomes an icon that is usually independent from the windows GUI.

Additionally, customer specific job function workstation GUIs are complex to program, i.e., they are difficult to define, create and edit; especially for application specific tasks. Most applications require that a user know and understand a programming language (such as Cobol, Algol, etc.) to customize an application specific program. In other words, the user must use a text editor.

Currently, there is no easy way to create application specific workstations. An application specific workstation is computer system programmed to perform job specific tasks, such as in insurance (e.g., underwriter workstation, claims workstation, etc.), banking (lender's workbench, credit station, etc.), public sectors (social services desk, public access terminal, etc.) or any other job specific processes. To create such applications, as explained above, requires the user to perform extensive programming. Custom development of such job specific workstations can take six or more man months of development effort, may be inflexible to changes or expansion to other job specific application requirements, and typically requires custom support. Moreover, these customized workstations do not integrate horizontal technologies such as word processing, E-mail and multimedia (voice, video, etc.).

SUMMARY OF THE INVENTION

The present invention is directed to a desktop programmable Graphical User Interface (GUI) workstation that can be easily programmed to perform a custom applications, without the need of text editor. In other words, programming the desktop programmable GUI workstation does not require the program user to utilize a text editor, create or edit code, or understand any particular programming language. The programmer user can program the workstation in an icon environment from predefined functions stored in libraries.

Once programmed the workstation employs a GUI which provides an end user with an easy to use and easy to understand interface to their application specific process. The user interface is structured to organize work tasks by major activities of the application specific process. The workstation allows the user to integrate generic window technology such as word processing into their application specific process.

A feature of the present invention is to reduce both the cost and time to implement a workstation capable of performing an application specific process. Another feature of the present invention is provide a flexible workstation that can be easily supported, modified, and expanded by the user without the need for complicated text editor programming and manipulation of code.

Further features and advantages will become apparent after reading the Detailed Description section and associated figures below.

BRIEF DESCRIPTION OF THE PREFERRED EMBODIMENTS

DETAILED DESCRIPTION OF THE PREFERRED EMBODIMENTS

The preferred embodiments of the invention are discussed in detail below. While specific configurations are discussed, it should be understood that this is done for illustration purposes only. After reading the following description, it will become apparent to a person skilled in the relevant art that other components and configurations may be used without parting from the spirit and scope of the invention.

1.0 Overview

Figure 2:
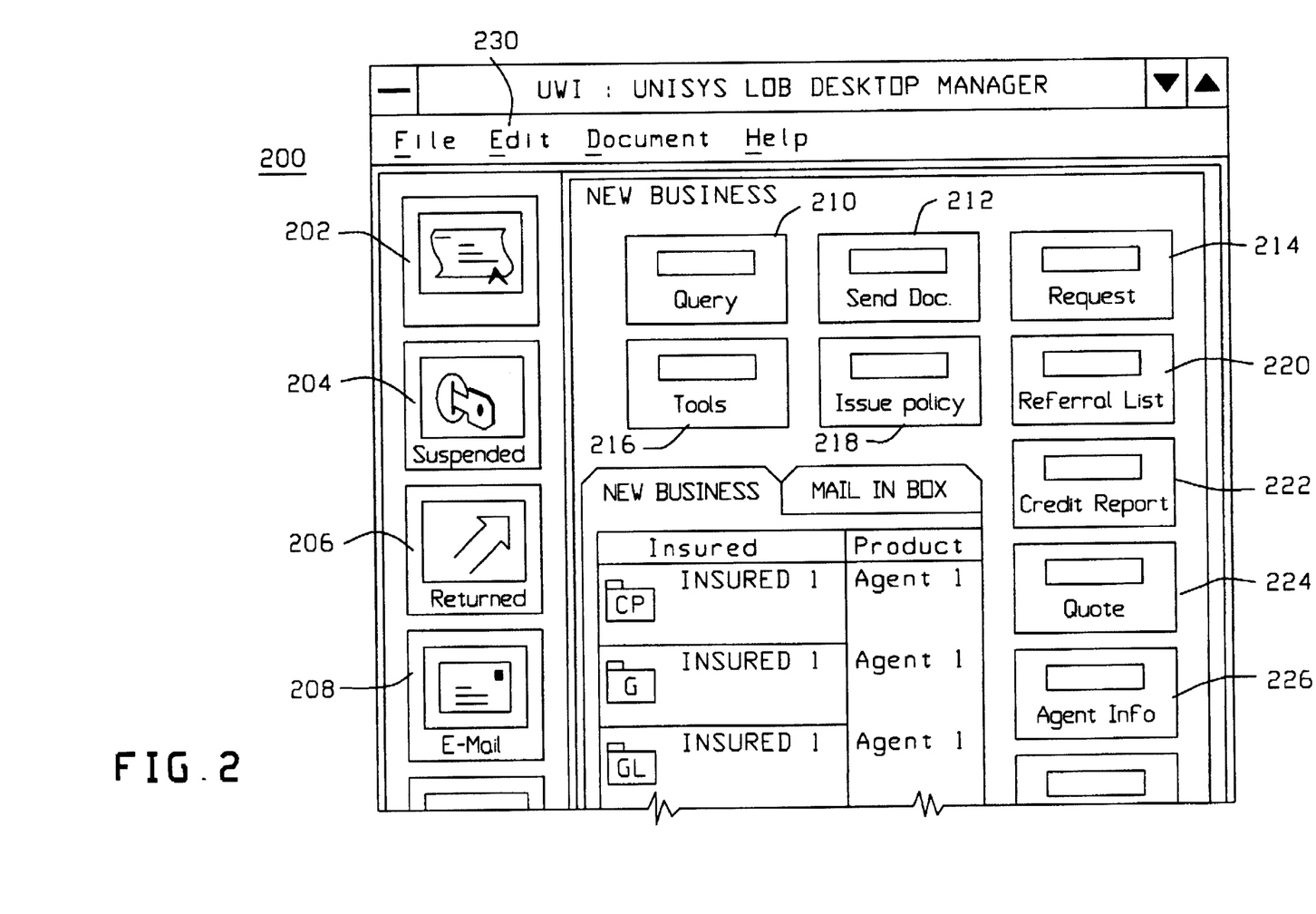
FIG. 2 shows a desktop programmable Graphical User Interface workstation 200 according to an example embodiment of the present invention.

FIG. 2 shows a desktop programmable Graphical User Interface (GUI) workstation 200 according to a preferred embodiment of the present invention. The desktop GUI workstation 200 includes pre-defined parameterized functions, that perform background document management and work flow activities, and, that provide non document management activities to fulfill other office and system integration requirements, such as E-Mail 208. These pre-defined parameterized functions are presented as interface buttons 202-226 that are organized to perform job related functions. The result is a desktop GUI 200 that includes facilities for establishing and managing desktop and document work flow, for pre-loading and organizing documents based on job functions, and for integration with standard workstation products (such as, Microsoft Word) and a user's existing data processing applications (e.g., word processing).

In a preferred embodiment, the workstation 200 is pan of a Folder® product offered by Unisys Corporation, Blue Bell, Pa., U.S.A. Folder is an imaging product that operates conjunction with a computer having at least 16 megabytes of RAM and sufficient memory to store images. The workstation 200 is capable of functioning with UNIX, OS/2 and NT solutions.

2.0 Desktop Programmable GUI Workstation

The desktop programmable GUI workstation 200 is structured to organize work tasks by major activities. Using as an example, in FIG. 2 is an Underwriter workstation 200. An Underwriter user may be responsible for writing policies for new business and handling cancellations, renewals and endorsements for particular product lines (e.g., commercial property, workers compensation, etc.). Each of these major activities tasks have several tasks that are required to process a policy. These may include such tasks as requesting an underwriter user for information such as obtaining a credit report 222 (the actual report is in the form of an electronic document image), and referring a policy submission to a manager for review and/or approval via 206. All these tasks are illustrated for purpose of example and can be any defined function, to be described below.

The example desktop programmable GUI workstation 200 illustrated in FIG. 2 includes three levels of tasks: main task buttons 202, 204, 206, specific task buttons 210, 212, 214, 216, 218, and menu item buttons 220, 222, 224, 226 that support the workstation 200. Main-task buttons 202, 204, 206, provide the user access to completely organized desktop specific to the task selected. For example, if the user selects new business button 202 on the left-hand side of workstation 200, then to the right-hand side of button 202, specific task buttons 210, 212, 214, 216, 218, associated with new business are displayed. These specific task buttons 210, 212, 214, 216, 218, are typically a sub-category of tasks associated with the main-task buttons 202, 204, 206, and typically are those that can perform pre-defined parameterized functions. Menu item buttons 220, 222, 224, 226 perform pre-defined parameterized functions associated with the specific task buttons 212, 214, 216, 218.

3.0 Programming the Desktop Programmable GUI Workstation

Programming the desktop programmable GUI workstation 200 does not require the program user to utilize a text editor, create or edit code, or understand any particular programming language. The programmer user can program the workstation 200 in an icon environment.

Figure 3:
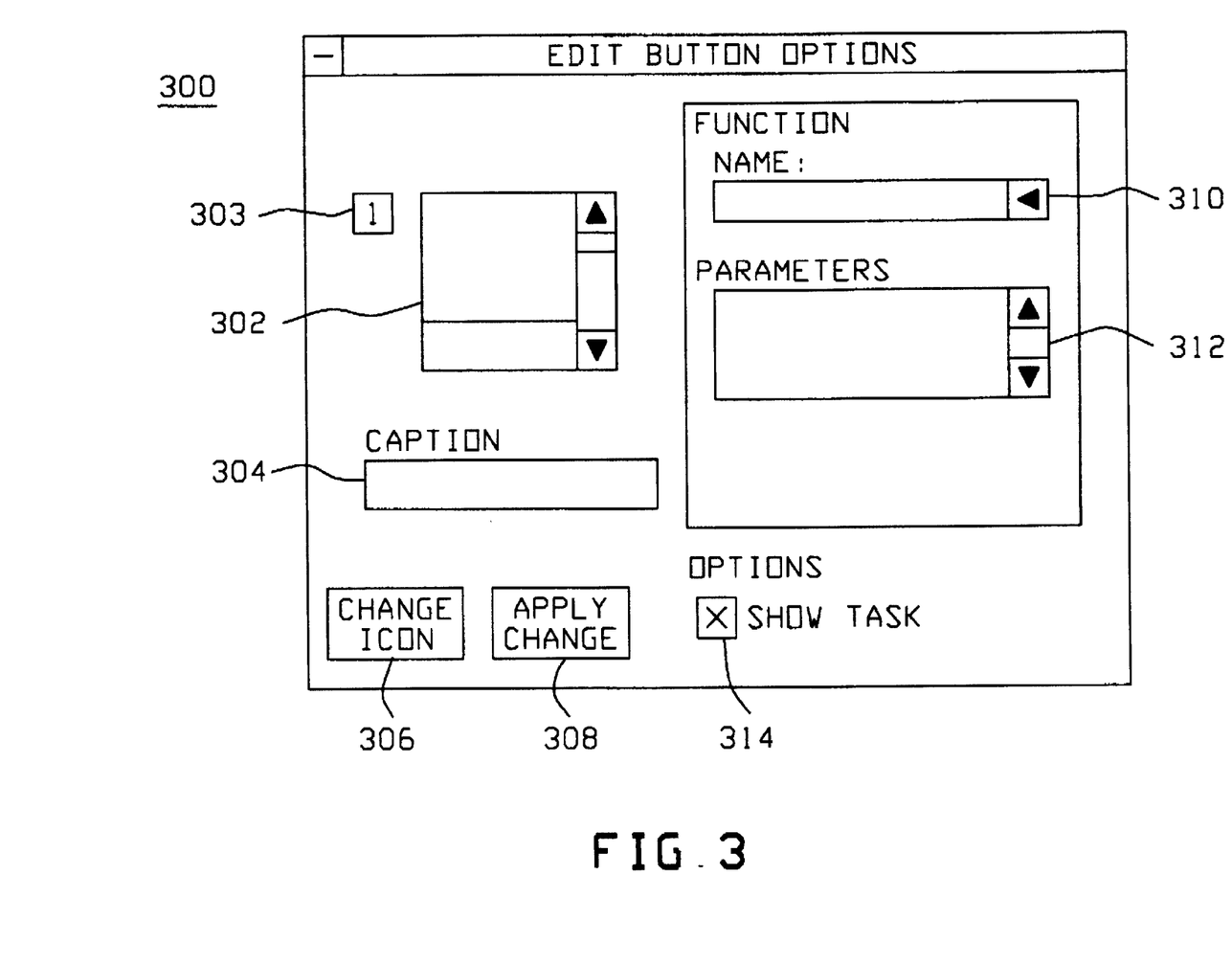
FIG. 3 shows a non-programmed programmable Graphical User Interface workstation.

FIG. 3 shows a non-programmed programmable GUI workstation 300. A non-programmed workstation can be accessed by selecting an edit option 230 on a tool bar 240 of the workstation 200 shown in FIG. 2. Referring to FIG. 3, a non-programmed workstation 300 includes undefined features. These features include: main tasks button 302, caption 304, change icon button 306, apply change icon button 308, function 310, parameters 312, and a show task option box 314. All these features and the methodology of programming a workstation is described by way of an example with reference to FIGS. 4, 5A and 5B below.

Figure 4:
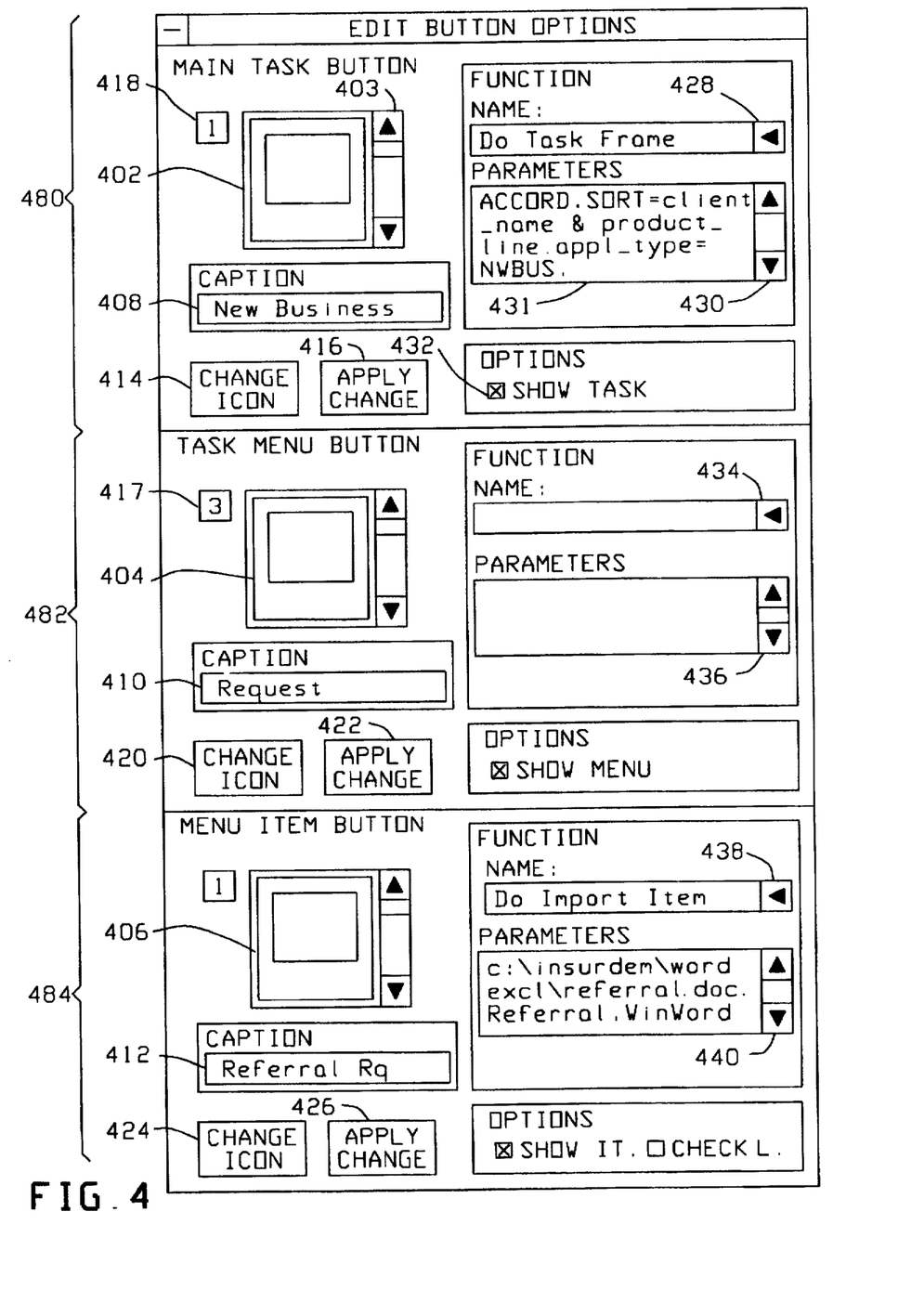
FIG. 4 is an example edit option screen for programming workstations according to the present invention.

FIG. 4 is an example edit option screen for programming workstation 200 is (shown in FIG. 2) and used in business insurance applications. For purposes of discussion, a description of how to program workstation 200 will be described with reference to the flow charts shown in FIGS. 5A and 5B and elements shown in FIG. 4.

As shown in FIG. 4, there are three levels of programmable buttons: main-task buttons 480, specific task buttons 482 and menu item buttons 484. Programming of main-task buttons 480 will be described first with reference to FIG. 5A.

Figure 5A:
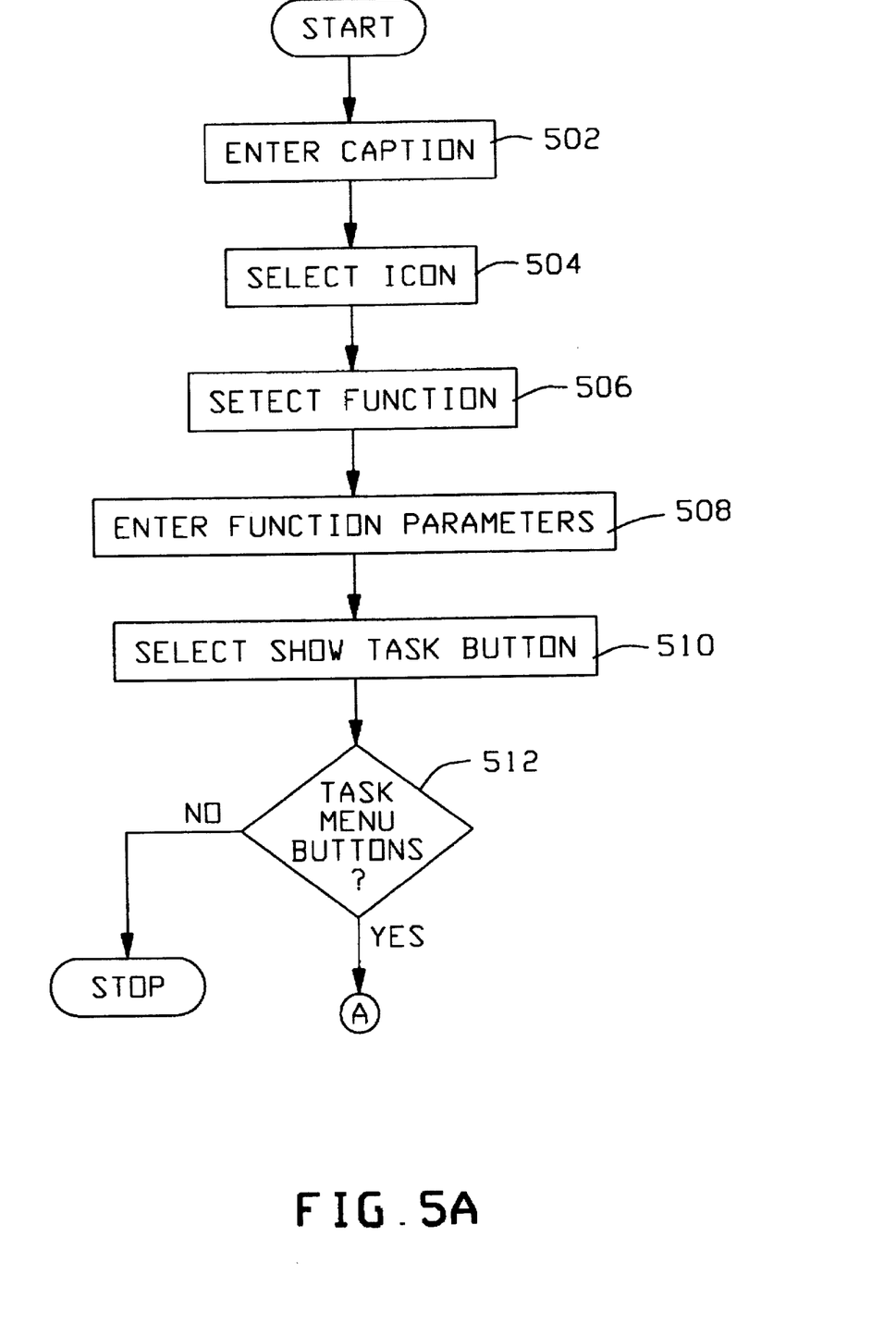
FIGS. 5A and 5B are flow charts showing of how to program a workstation without the need of text editor.
Figure 5B:
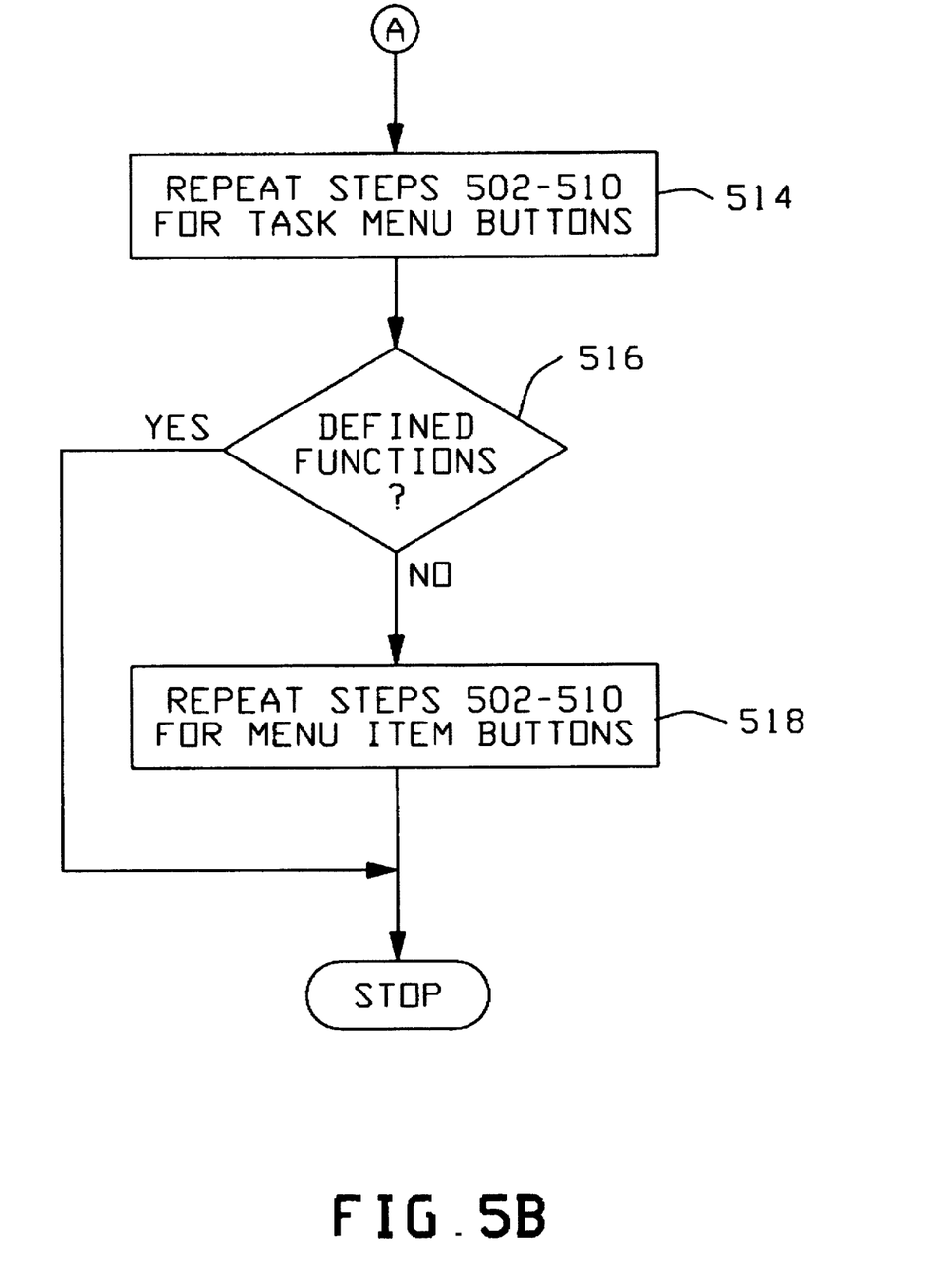

In step 502, a main task button 402 is defined. A user depresses the change icon button 414 (whether starting from initialization or changing a preprogrammed icon). Next, the user enters a caption 408 "New Business" to be associated with the main task button 402. Usually, the caption describes the functionality purpose of the button 402. This caption can be manually typed by a user or selected from predefined set of saved captioned stored in a library (shown in FIG. 6) of main captions. What ever appears in caption 408 will appear on the bottom of button 402, once the user pushes the apply change button 416.

Next, in step 504, a user selects an icon. Icons can be previewed by depressing the up-down arrows 403 to the right of button 402 using a pointer (not shown via a mouse). Various icon pictures appear as a user scrolls the up-down arrows 403. The user can then select a graphical icon most closely associated the task description. Icons can also be added to an icon library (not shown) of stored images, by importing images into the icon library. Once the user selects an appropriate icon, the apply change button 416 can be depressed to enter the icon.

In step 506, a user selects a predefined parameterized function to perform the described task associated with the main task button 402. A user selects a predefined parameterized function by accessing the function button 428, which accesses a library (to be described below) of pre-defined parameter functions stored in memory and supported by the workstation 200. A predefined parameterized function is akin to a macroinstruction, because the function may be linked to a defined sequence of instructions (e.g., a routine or program) that when accessed performs the task associated with the main task button 418. Functions may complete several background activities, not apparent to a user, to complete a task. The user when operating a workstation 200 (shown in FIG. 2) should only have to push a button to perform a task.

In step 506, a user enters the predefined parameterized function's parameters. In other words, the parameter provides a means of associating addressability of data defined by the calling function program with data from other applications or databases. Thus, the parameter acts as query by requesting data from a database, based on specified conditions of the parameter. For example, the parameter could request a list of customers whose balance is greater than $1,000.00 in a store credit report database. The parameter can be typed into window 431, or preselected from a library (shown in FIG. 6) of parameters. Additionally, by manipulating up-down buttons 430, a user can edit a parameter and save the modification by depressing the apply change button 416.

In step 510, a user decides whether to show the main task button 402 as an icon in workstation 200 or keep the button hidden. For example, it may be advantageous to keep security buttons hidden in workstation 200, unless a user utilizes a password or enters the edit button option screen.

In a decisional step 512, if a main task buttons 202, 204, 206, 208 (shown in FIG. 2) requires task menu buttons 210, 212, 214, 216, and 218 (shown in FIG. 2) then according to the "YES" branch of step 512, a task menu button 404 associated with main task button 402 is defined by repeating steps 502–510 as shown in step 514. In the example of FIG. 4, task menu button 404 is an icon with no associated functions and parameters, so it is not necessary to perform steps 506 and 508. Additionally, in this example, request task menus button 404 is the third task menu button associated with main task button 402 as indicated by a dynamic association window 417. The number of buttons associated with main task buttons in a workstation 200 is dynamic.

If in step 512, a main task button 202–208 requires no task buttons 210–218, then according to the NO branch of step 512, no task menu buttons are defined. For example, E-Mail button 208 of FIG. 2 has no associated task menu buttons, since it directly accesses an E-mail program. If E-mail button 208 is selected, the E-mail program appears in a window (not shown) along side workstation 200.

Referring back to FIGS. 4 and 5, in decisional step 516, if there are no associated functions associated with task menu button 404 (as shown by example in FIG. 4) then menu item buttons must be defined, which are associated with task menu button 404. In this example menu item 406 is Referral Rq, which is also shown in FIG. 2 as 220 and is one of four shown menu item buttons 220–226 associated with task menu button 214, 404. Again, the steps involved in defining menu item button 406 are identical to steps 502–510 and shown in step 518.

Figure 6:
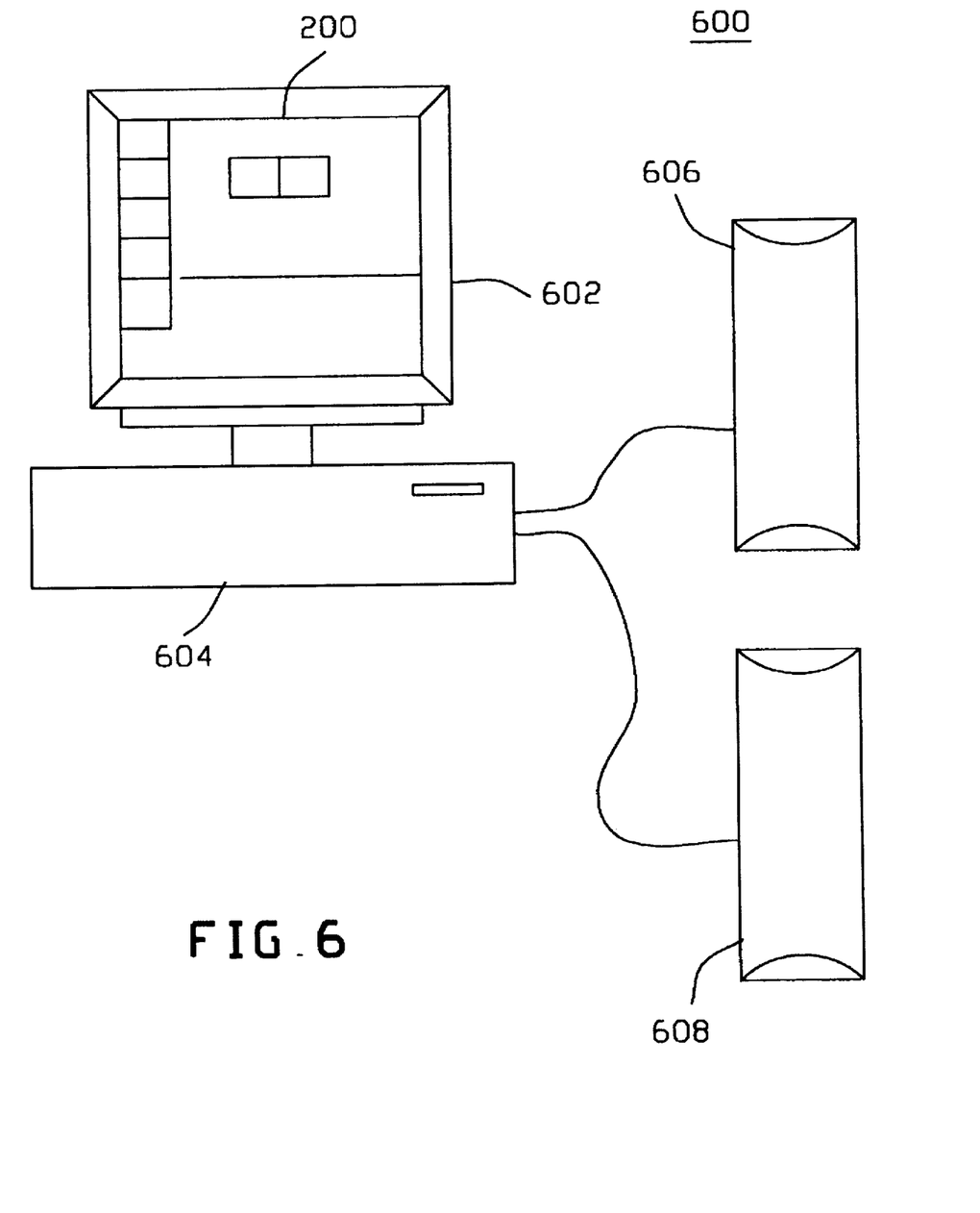
FIG. 6 is a block diagram showing a hardware system in which a workstation of the present invention functions.

Referring to FIG. 6 is a block diagram showing a hardware system 600 in which workstation 200 operates. System 600 includes a display 602, a processing unit 604, a predefined parameterized function library 606 and a predefined parameter library 608. Libraries 606 and 608 represent a portion of memory employed by system 600. All elements are integrated as system 600.

In the preferred embodiment, workstations are developed using Visual Basic. Depending on the application specific task associated with a workstation, libraries 606 and can incorporate functions and function parameters associated with modules of software imported from various sources or customized for a specific workstation application. Once added to the libraries, the libraries can grow in volume making tailored workstations easier to design. In the example workstation 200 libraries 606, 608 included the following predefined parameterized functions:

Example Functions with no parameters

DoCreateNote—Creates an InfoImage note, and attaches to a selected document.

DoDiary—Presents a diary tool to keep reminders and notes associated with desktop items.

DoMailCompose—Allows a user to compose and send an E-mail message.

DoMailViewList—Requests any mail associated with Microsoft mail in box items and displays a list of mail. The main can be selected and opened.

DoRefreshIndex—Retrieves the latest index information from InfoImaage for the document selected and updates the local data base GRID display.

DoReserveDoc Reserves or unreserves selected documents on the desktop workstation.

DoShowIndexForm Displays Infoimage index forms for selected documents.

DoUpdateIndexForm—Displays an index form for selected product line documents and allows a user to update the index as required by the user's task.

Example Functions with Parameters

DoCreateDocument<Class>,<Name>,<Document type>-Creates an Image document

DoDeleteObject<Confirm Delete?>-Deletes a selected object or note from a document.

DoDeskDelete<Confirm Delete?>-Deletes selected notes from desktop.

DoExportObject<send mail>,<tofile>-Export an object to a mail compose or to a file for storage.

DoFileCabQuery [Query Def]-Perform a query and display a list of hits for retrieval.

DoGetNextItemFromQ<Queue name>,<# of items>-Retrieves items from the named queue, and places them on the workstation desktop.

DoGetNextReserved<Queue name>,<# of items>-Retrieves items from named queue and places them on a desktop reserved.

DoImportItem [File],[Name],[Import_Type],<Doc_Type>—Imports a foreign object (i.e., Word document, voice, etc.). The Import type specifies the actual type of document type. The Doc_Type selects a document for automatic import.

DoListDirectory<Directory>,<Pattern>=Displays contents of a specified directory based on pattern requested.

DoPrintDoc<Remote Printer>,<Comment>—Prints a selected document.

DoRunProgram[Program name]<Parameters>Runs a program.

DoSendDoc<Queue name or 'Reply_TO'><Document type>,<Only Reserved Docs 0=no,1=yes.,<Leave on desktop? 0=no, 1=yes>,<Index=value>—Sends documents to a named queue. The queue can be specific or refer to a reserved index field 'REPLY_TO' that contains the queue name the document came from. Additionally, options to leave on the desk top is available and the changing of User Index Field values is available.

DoSetIndex[Name],[Value] Set an image index name to a specified value.

DoTaskFrame<Query Def>,Sort=,Index=value,Index= value-Displays taskframe with Grid using specified Query Definition. Sort by defined index fields and only display index records that meet Index=value criteria. Up to ten Index=value parameters are allowed.

As apparent from the example given above, libraries 606–608 can contain hundreds of specified subroutines that can be called by simple high level language instructions. It is apparent to those skilled in the art how to write code in visual basic to retrieve programs resident in memory. Thus, the desktop programmable GUI workstation provides an end user with an easy to use interface in a business process. As for customizing the workstation, all that is required are integrated predefined parameterized functions stored in a library 606, 608. If customized functions need to be added they can be written in a text editor and supplied as a function name in the libraries. A workstation's flexibility grows as more functions are added to the libraries 606, 608.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of graphically programming a graphic user interface manager of a computer to provide a plurality of application specific applications under a single collective workspace application comprising the steps of:

opening a generic task window for the purpose of adding tasks to a workspace screen;

selecting for a major activity application specific tasks or routines previously programmed into the computer under a plurality of different application specific programs;

assigning said major activity to one of a plurality of main task function keys for accessing said major activity and said application specific tasks;

assigning said application specific tasks or routines to a plurality of application specific function keys as a subcategory of said main task function key;

entering into said generic task window from a previously programmed library individual main task and application specific task icons and function data for each main task to be displayed; and closing said generic task window; whereby a routine of a plurality of application specific tasks may now be performed by selecting a major task to be performed as a new workspace application program.

2. The method of claim 1, which further includes the steps of assigning sub-tasks to a plurality of menu item keys as a predefined subspecific function of said application specific tasks.

3. The method of claim 2, which further includes the steps of selecting a main task function key and an application specific function key, and simultaneously displaying on said workspace screen a plurality of menu item keys associated with said selected application specific function key.

4. The method of claim 3, further including the step of selecting one of said plurality of menu item keys for the purpose of executing a subspecific function.

5. The method of claim 1, which further includes the step of displaying a plurality of selectable main task function keys in said workspace after closing said generic task window.

6. The method of claim 5, which further includes the steps of selecting one of said plurality of selectable main task function keys, and simultaneously displaying on said workspace a plurality of selectable application specific function keys associated with the major activity of said selected main task function key.

7. The method of claim 2, further including the steps of selecting a main task function key and an application specific function key for the purpose of executing an application specific function.

8. A method of graphically generating a plurality of selectable programs on a graphical user interface display screen, comprising the steps of:

generating a generic edit option task window on a display screen of a computer having a graphic user interface program;

selecting from a plurality of previously programmed application specific programs a plurality of major routines;

displaying on said display screen said major routines as selectable major tasks;

selecting from said application specific programs a plurality of subroutines to be associated with a major routine;

displaying simultaneously with a selectable major task a plurality of selectable subroutine tasks;

assigning said major tasks and said subroutine tasks to function keys of said computer;

entering into said edit option task window icons associated with each said task; and performing a routine of plurality of specific tasks by selecting a major task to be performed as a new application program.

* * * * *